(12) United States Patent
Kim et al.

(10) Patent No.: US 9,452,797 B2
(45) Date of Patent: Sep. 27, 2016

(54) SUPPORT MODULE AND ROBOT HAVING THE SAME

(71) Applicant: Samsung Electronics Co., Ltd., Suwon-si (KR)

(72) Inventors: Joo Hyung Kim, Seongnam-si (KR); Kyung Shik Roh, Seongnam-si (KR); Kee Hong Seo, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 497 days.

(21) Appl. No.: 13/723,534

(22) Filed: Dec. 21, 2012

(65) Prior Publication Data

US 2013/0162015 A1 Jun. 27, 2013

(30) Foreign Application Priority Data

Dec. 23, 2011 (KR) ................ 10-2011-0141530

(51) Int. Cl.
*B62D 57/02* (2006.01)
*B25J 9/00* (2006.01)
*B25J 15/00* (2006.01)
*B62D 57/032* (2006.01)

(52) U.S. Cl.
CPC ............ *B62D 57/02* (2013.01); *B25J 9/0009* (2013.01); *B25J 15/0023* (2013.01); *B62D 57/032* (2013.01); *Y10S 901/01* (2013.01)

(58) Field of Classification Search
CPC ..................................... B62D 57/032
USPC ................. 180/8.1, 8.5, 8.6; 901/1
See application file for complete search history.

(56) References Cited

U.S. PATENT DOCUMENTS

| | | | |
|---|---|---|---|
| 5,421,426 A * | 6/1995 | De Beaucourt et al. ...... 180/8.1 |
| 5,455,497 A * | 10/1995 | Hirose et al. ............ 318/568.12 |
| 6,443,993 B1 * | 9/2002 | Koniuk .......................... 623/24 |
| 7,093,497 B2 * | 8/2006 | Takenaka et al. .............. 73/763 |
| 7,904,200 B2 * | 3/2011 | Takenaka et al. ............ 700/245 |
| 2005/0011685 A1 * | 1/2005 | Takenaka et al. ............. 180/8.6 |

FOREIGN PATENT DOCUMENTS

KR 10-2009-0061390 6/2009
KR 10-2010-0085376 7/2010

* cited by examiner

*Primary Examiner* — Tony Winner
(74) *Attorney, Agent, or Firm* — Harness, Dickey & Pierce, P.L.C.

(57) ABSTRACT

A support module includes a first rigid body, a space formation body connected to the first rigid body and forming an enclosed space, and a plurality of hard particles located within the enclosed space. When at least a predetermined pressure is applied to the support module such that a volume of the enclosed space is decreased to a predetermined value, the plurality of hard particles and space formation body form a second rigid body. Such a support module may improve the stability of a walking robot, the grip of a gripping structure, or the stability of a load-bearing structure.

13 Claims, 10 Drawing Sheets

SUPPORT MODULE AND ROBOT HAVING THE SAME

CROSS-REFERENCE TO RELATED APPLICATIONS

This application claims the priority benefit of Korean Patent Application No. 10-2011-0141530, filed on Dec. 23, 2011 in the Korean Intellectual Property Office, the disclosure of which is incorporated herein by reference.

BACKGROUND

1. Field

The following description relates to a support module supporting a load of a robot and a robot having the same.

2. Description of the Related Art

Unlike an industrial robot arm which is in a fixed location, or a robot that changes location using wheels, in the case of a legged robot, an interaction between the ground and the robot is changed with each step. In general, in order to cause the legged robot to stand or to move without falling, the center of mass of the robot needs to be located within a support polygon formed by contact points of legs of the robot with the ground, or a zero moment point needs to be located within the support polygon. Furthermore, because an impact may occur according to a movement when a foot contacts the ground, and the robot may lose balance by such an impact, it is important to effectively control the impact and to maintain the support polygon.

Conventional legged robots have various structures provided as the soles of the feet, such as a structure in which a plane formed of an impact-absorbable material is attached to one flat plate (generally formed of a high-strength metal), or a structure in which only the corners of a polygonal (triangular or rectangular) shape protrude, for example, and shapes and materials of the soles of the feet are varied according to various walking motions. From among these structures, in the case of a foot, only the corners of which protrude, a mechanism executing change of the length of the protruding parts may be used or a sensor may be attached to the foot, thereby increasing interaction with the ground surface and measuring force between feet.

In the case of a foot including one flat plate having high strength, an impact occurring when the foot contacts the ground surface is directly transmitted to robot joints, and thus stability of the robot is lowered. If the foot is formed of a material reducing such impact, the robot may be shaken by even a small vibration. Further, in case of a structure of a foot, the entirety of which contacts the ground, a support polygon may not be formed by a small protruding part, and if a 3-point or 4-point supported foot is provided in order to avoid such a problem, a support polygon of the foot may have an excessively small area.

SUMMARY

Therefore, it is an aspect of the following description to provide a robot having an improved structure which stably walks.

Additional aspects of the invention will be set forth in part in the description which follows and, in part, will be obvious from the description, or may be learned by practice of the invention.

In accordance with an aspect of the following description, a walking robot includes a body part, at least one leg part connected to the body part and movably supporting the body part, a foot connected to a lower end of the at least one leg part, and at least one support module connected to a lower end of the foot, wherein the at least one support module includes a first rigid body connected to the lower end of the foot, a space formation body connected to at least a portion of the first rigid body and forming a space part together with the at least a portion of the first rigid body, and a plurality of hard particles located within the space part that form a second rigid body supporting a load of the robot when the support module contacts the ground surface and the volume of the space part is decreased to at least a predetermined value.

The space formation body may be formed of a material which is deformable to a shape corresponding to the shape of the ground surface during a contact process of the support module with the ground surface and is not contracted or expanded in any direction.

A maximum volume of the space part may be achieved in a state in which pressure is not applied to the support module.

Air gaps may be formed between the plurality of hard particles, a pressure required to form the second rigid body may increase as the volume in the space part occupied by the air gaps is increased, and a pressure required to form the second rigid body may decrease as the volume in the space part occupied by the air gaps is decreased.

In accordance with an aspect of the following description, a support module includes a first rigid body, a space formation body connected to at least a portion of the first rigid body and forming a space part together with the at least a portion of the first rigid body, and a plurality of hard particles located within the space part that form a second rigid body supporting a load of the first rigid body when pressure is applied to the support module and the volume of the space part is decreased to at least a predetermined value.

The space formation body may be formed of a material which is not expanded or shrunk in any direction.

A maximum volume of the space part may be achieved in a state in which pressure is not applied to the support module.

Air gaps may be formed between the plurality of hard particles, and the volume in the space part occupied by the air gaps may be proportional to the pressure required to form the second rigid body.

At least three support modules may be connected to a structure to support the structure, and a center of mass of the structure may be located within a support polygon formed by the at least three support modules.

A surface contact structure includes a rigid structure and a contact structure connected to the rigid structure and having a first shape, where the contact structure further includes a deformable structure containing a plurality of particles that are mobile within the deformable structure when a volume of the deformable structure is greater than or equal to a predetermined value, and the contact structure becomes rigid when at least a predetermined amount of pressure is applied to the contact structure.

The contact structure may be adapted to contact a surface, and the rigid structure may be connected to a load-bearing structure.

The rigidity of the contact structure may result from a decrease in the volume of the deformable structure less than the predetermined value such that the plurality of particles are immobilized within the deformable structure.

The mobility of the plurality of particles within the deformable structure may be restored when the at least a predetermined amount of pressure is removed from the contact structure.

The contact structure may be restored to the first shape when the contact structure is not in contact with a surface.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
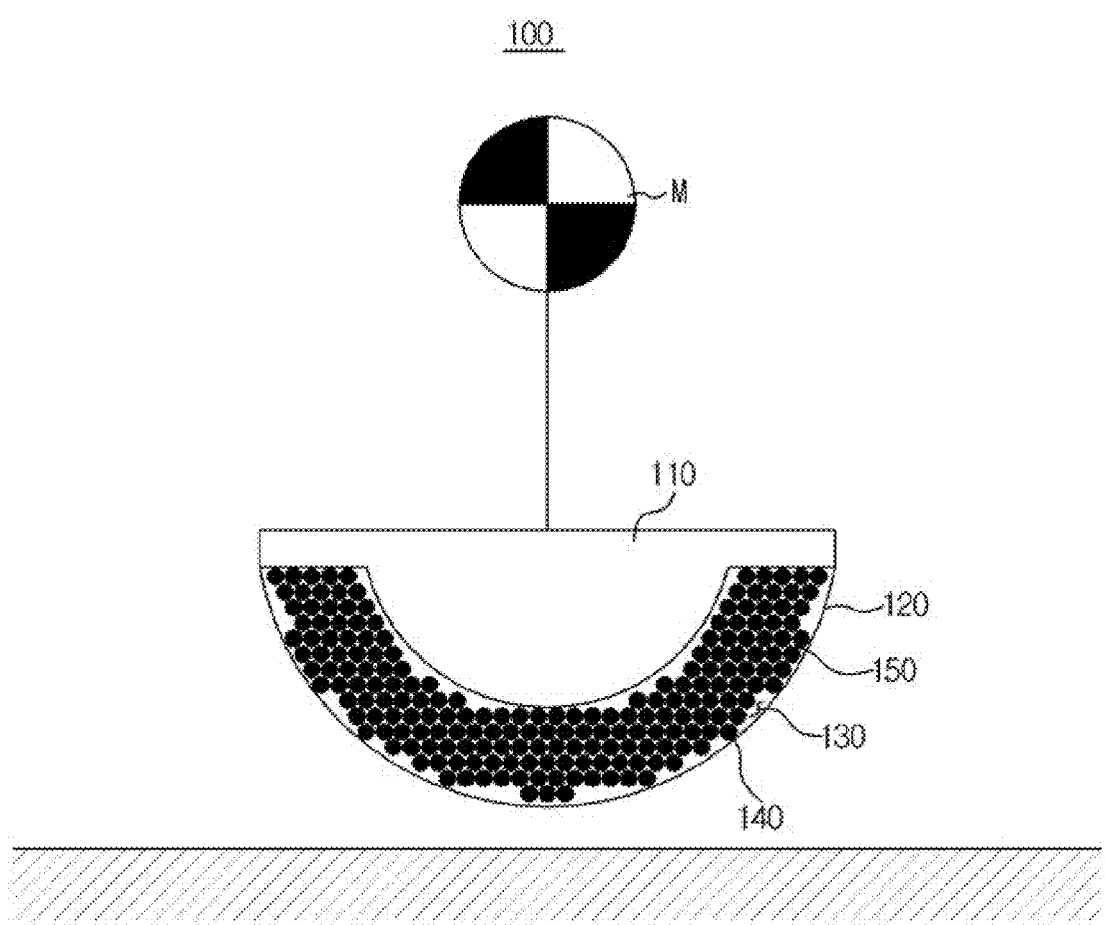
FIG. 1 is a view illustrating a support module in accordance with an embodiment.

Reference will now be made in detail to the embodiments of the present invention, examples of which are illustrated in the accompanying drawings, wherein like reference numerals refer to like elements throughout.

Figure 2A:
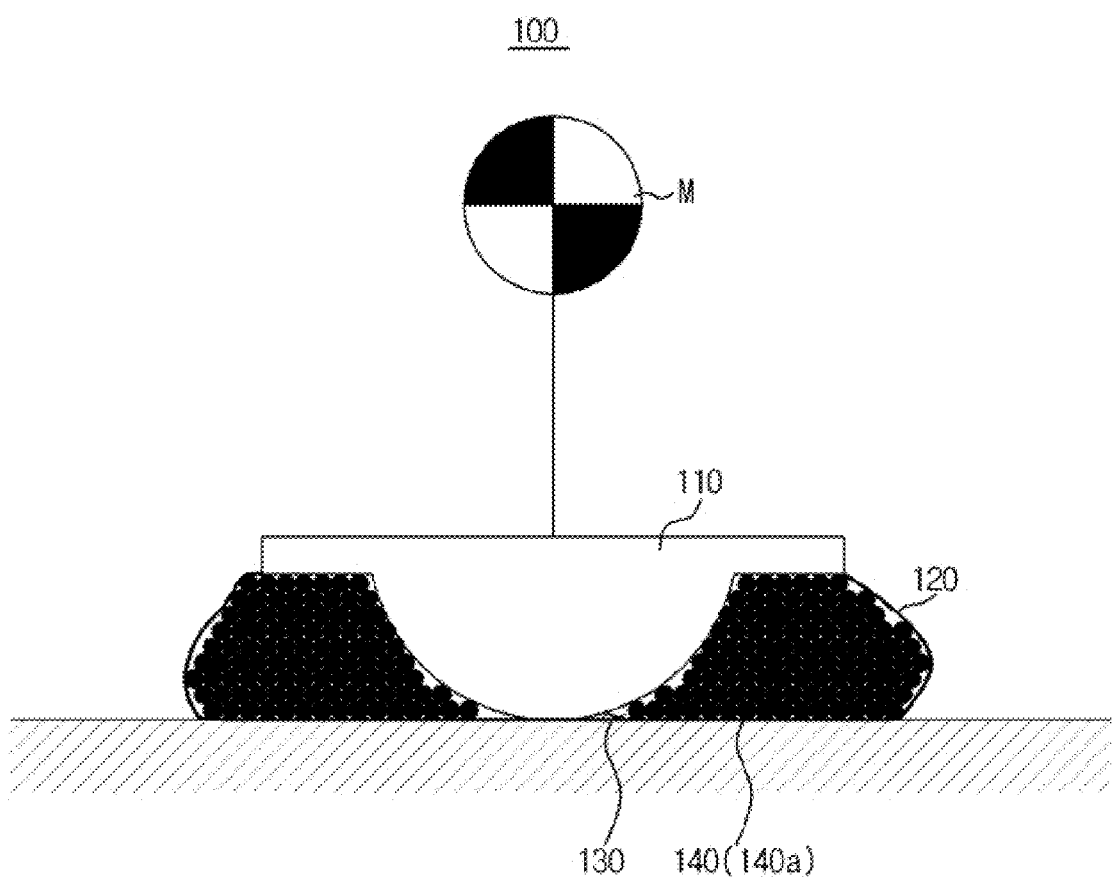
FIGS. 2A to 2C are views illustrating the support module forming a rigid body.
Figure 2B:
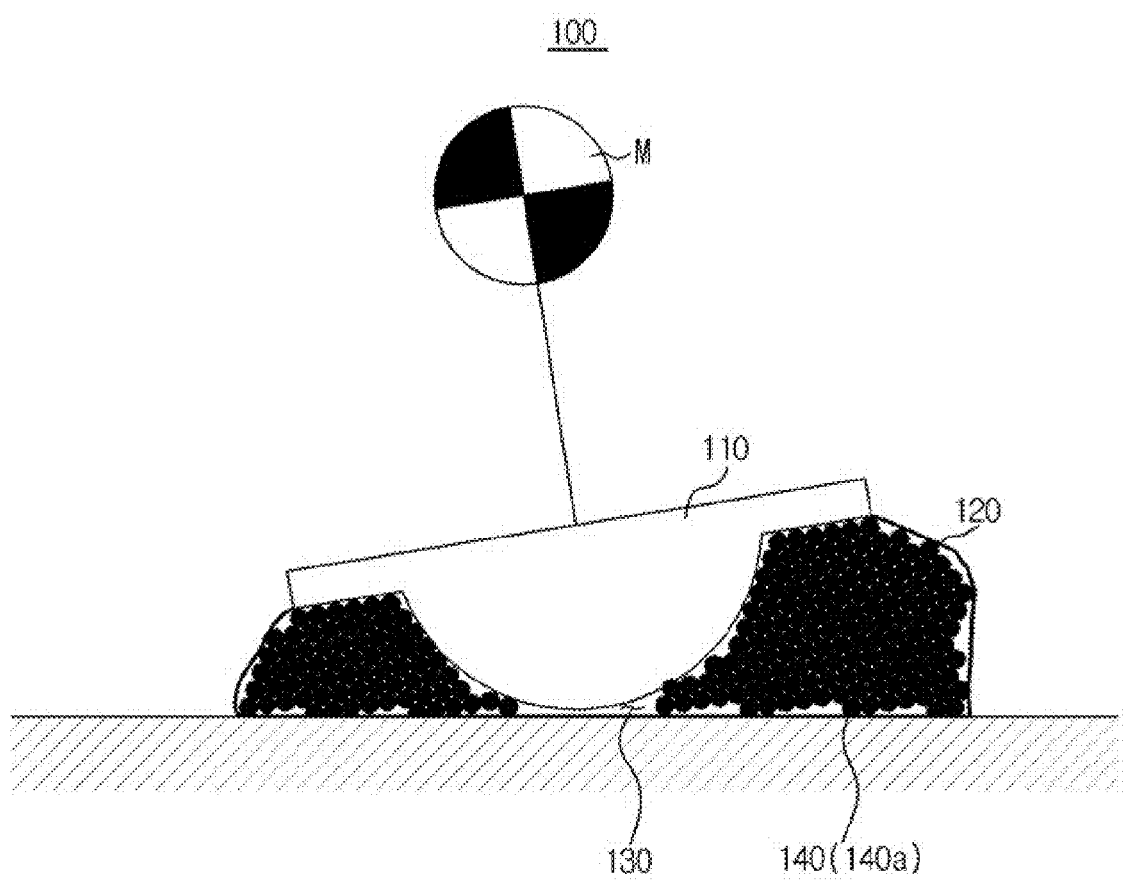
Figure 2C:
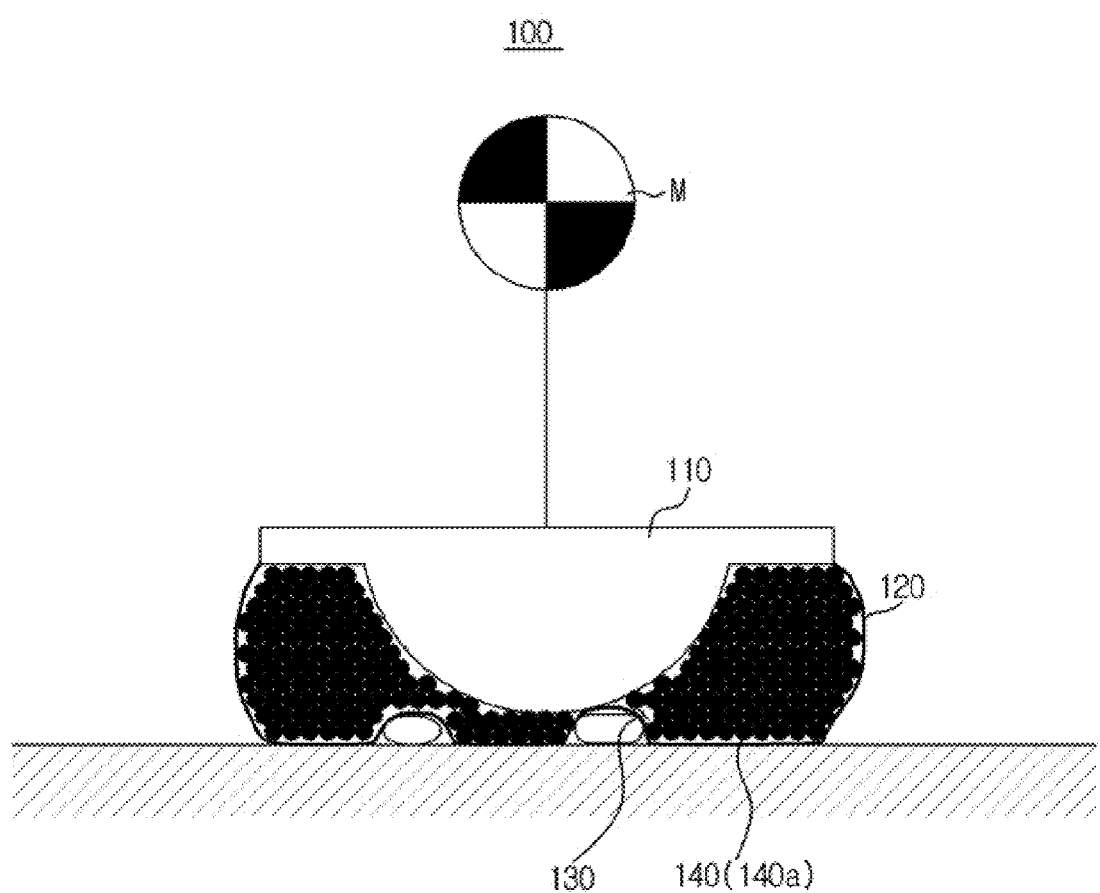

FIG. 1 is a view illustrating a support module in accordance with an embodiment, and FIGS. 2A to 2C are views illustrating the support module forming a rigid body.

As shown in FIGS. 1 to 2C, a support module 100 includes a first rigid body 110 connected to an object M to be supported, a space formation body 120 connected to a lower part of the first body 110, a space part 130 formed by the first rigid body 110 and the space formation body 120, and a plurality of hard particles 140 located within the space part 130.

The first rigid body 110 may be formed of a material having rigidity, such as steel, aluminum, or plastic, for example, such that the shape of the first rigid body 110 is not easily deformed by external force.

The space formation body 120 is connected to at least a part of the lower surface of the first rigid body 110, and the first rigid body 110 and the space formation body 120 form the space part 130. The space formation body 120 may be formed of a material, the shape of which is freely deformable by external force, and which is not contracted or expanded in any direction by itself.

The plurality of hard particles 140 are located within the space part 130, and air gaps 150 are formed between the plurality of hard particles 140. The plurality of hard particles 140 have elasticity or smoothness in response to external force if sufficient air gaps 150 are formed between the plurality of hard particles 140, and have rigidity and thus form a hard support body as the air gaps 150 are reduced.

As shown in FIG. 1, when external force is not applied to the support module 100, the space formation body 120 has a semicircular shape, and at this time, the maximum volume of the space part 130 is achieved. As shown in FIG. 2A, when external force is applied to the support module 100, i.e., when the support module 100 contacts the ground, the volume of the space part 130 is gradually decreased by the space formation body 120, the shape of which is freely deformable by external force, and the air gaps 150 within the space part 130 are reduced. The volume of the inside of the space part 130 is decreased to a designated value or less and thus the volume in the space part 130 occupied by the air gaps 150 within the space part 130 is decreased to a designated value or less, the plurality of hard particles 140 within the space part 130 are jammed and do not move in any direction. Here, the plurality of hard particles 140 form a second rigid body 140a having rigidity. Such a phenomenon in which the plurality of hard particles 140 located within the space part 130 are jammed to form the hard rigid body according to the volume of the space part 130 is referred to as particle jamming.

A point of time when particle jamming occurs may be adjusted according to the intensity of external force applied to the support module 100 by adjusting the maximum volume of the space part 130 and the volume of the air gaps 150 within the space part 130 when external force is not applied to the support module 100, and the volume of the air gaps 150 within the space part 130 may be adjusted through the number or the volume of the plurality of hard particles 140 located within the space part 130.

As the volume of the air gaps 150 increases, an external pressure required to cause particle jamming increases, and as the volume of the air gaps 150 decreases, the external pressure required to cause particle jamming decreases. That is, as the volume of the air gaps 150 increases, an external force required to cause the plurality of hard particles 140 to form the second rigid body 140a increases, and as the volume of the air gaps 150 decreases, the external force required to cause the plurality of hard particles 140 to form the second rigid body 140a decreases.

FIGS. 2B and 2C respectively illustrate cases in which the support module 100 has rigidity when the support module 100 does not vertically support a load and when the ground surface contacting the support module 100 is not flat. In the initial stage in which particle jamming does not occur, the support module 100 is smoothly and flexibly operated in response to the direction of a load applied to the support module 100 or the shape of the ground surface contacting the support module 100, and when the volume of the inside of the space part 130 is decreased to a designated value or less according to application of load of a designated intensity or more and the volume in the space part 130 occupied by the air gaps 150 is decreased to a designated value or less, particle jamming occurs and the support module 100 may exhibit rigidity and thus support various structures.

Figure 3:
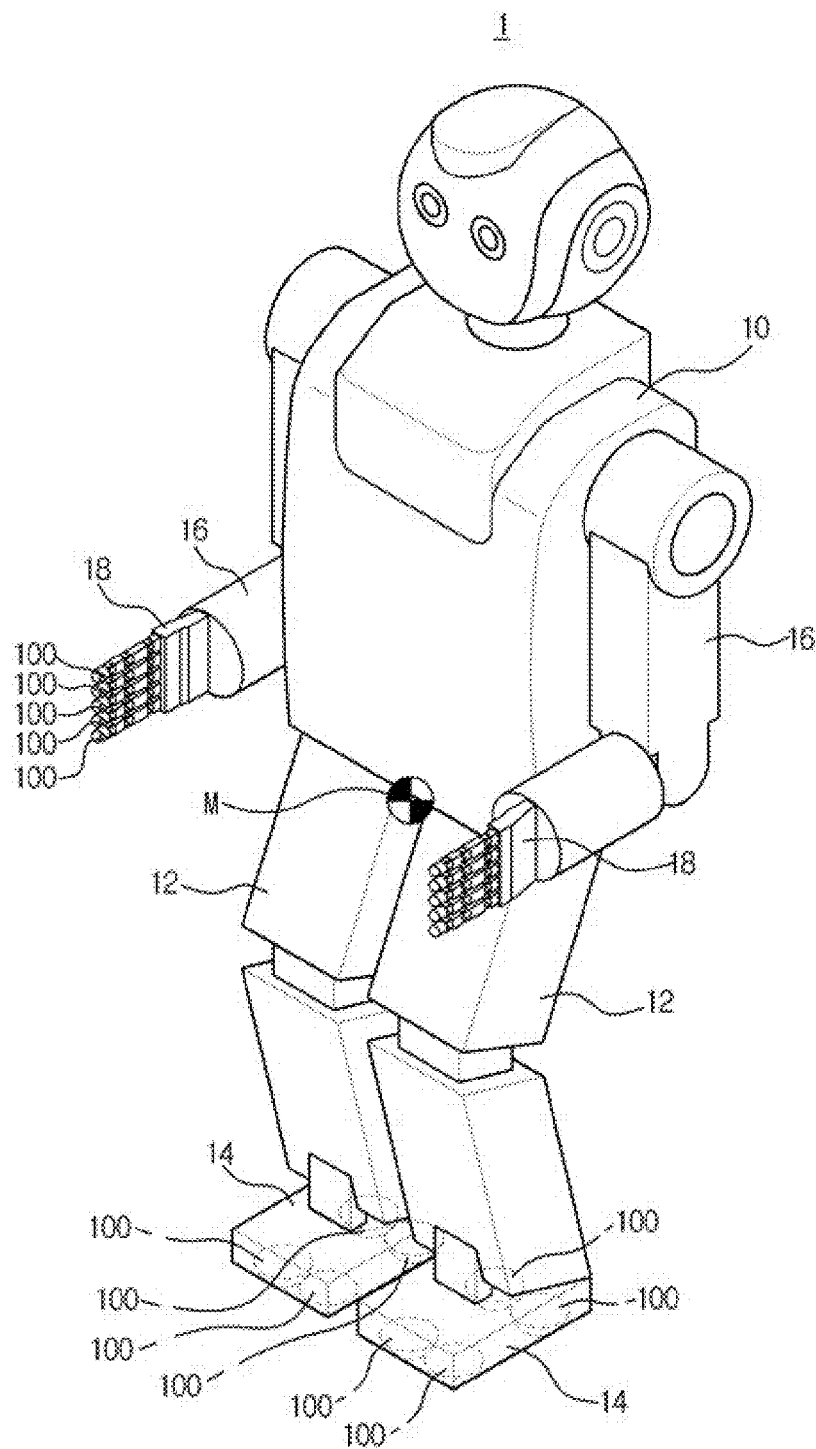
FIG. 3 is a view illustrating a robot with which support modules in accordance with an embodiment are connected.
Figure 4A:
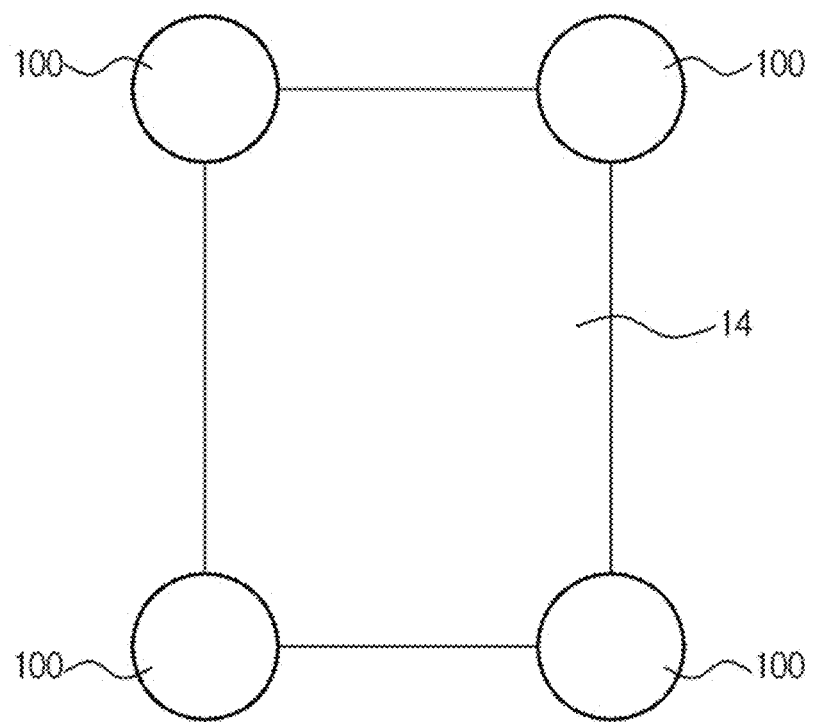
FIGS. 4A to 4C are views illustrating the support modules in accordance with an embodiment which are connected to a foot of the robot.
Figure 4B:
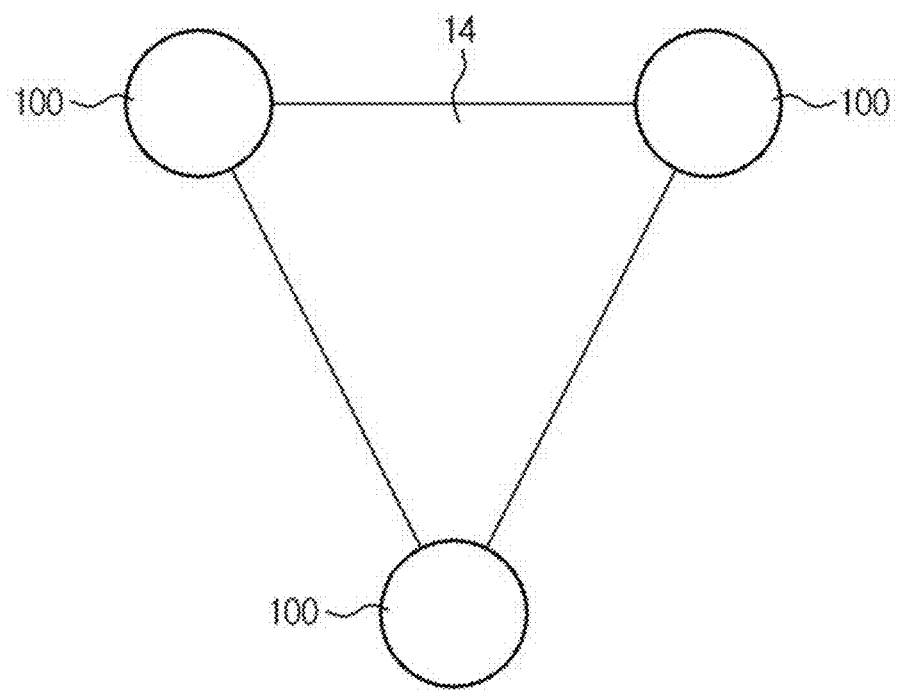
Figure 4C:
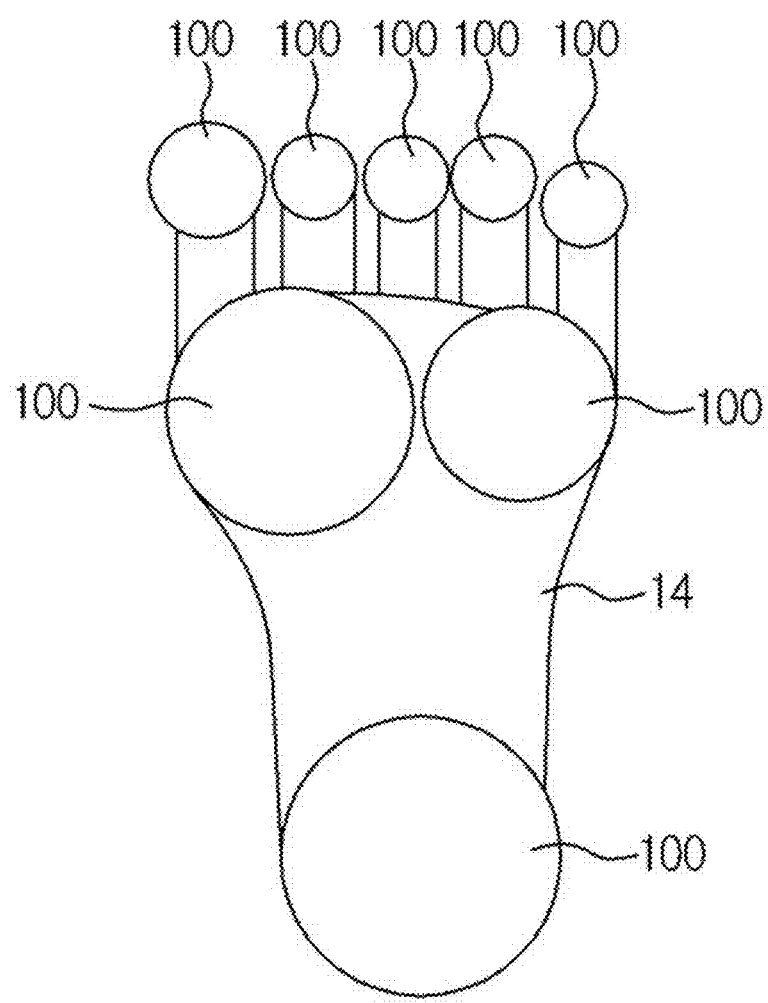
Figure 5:
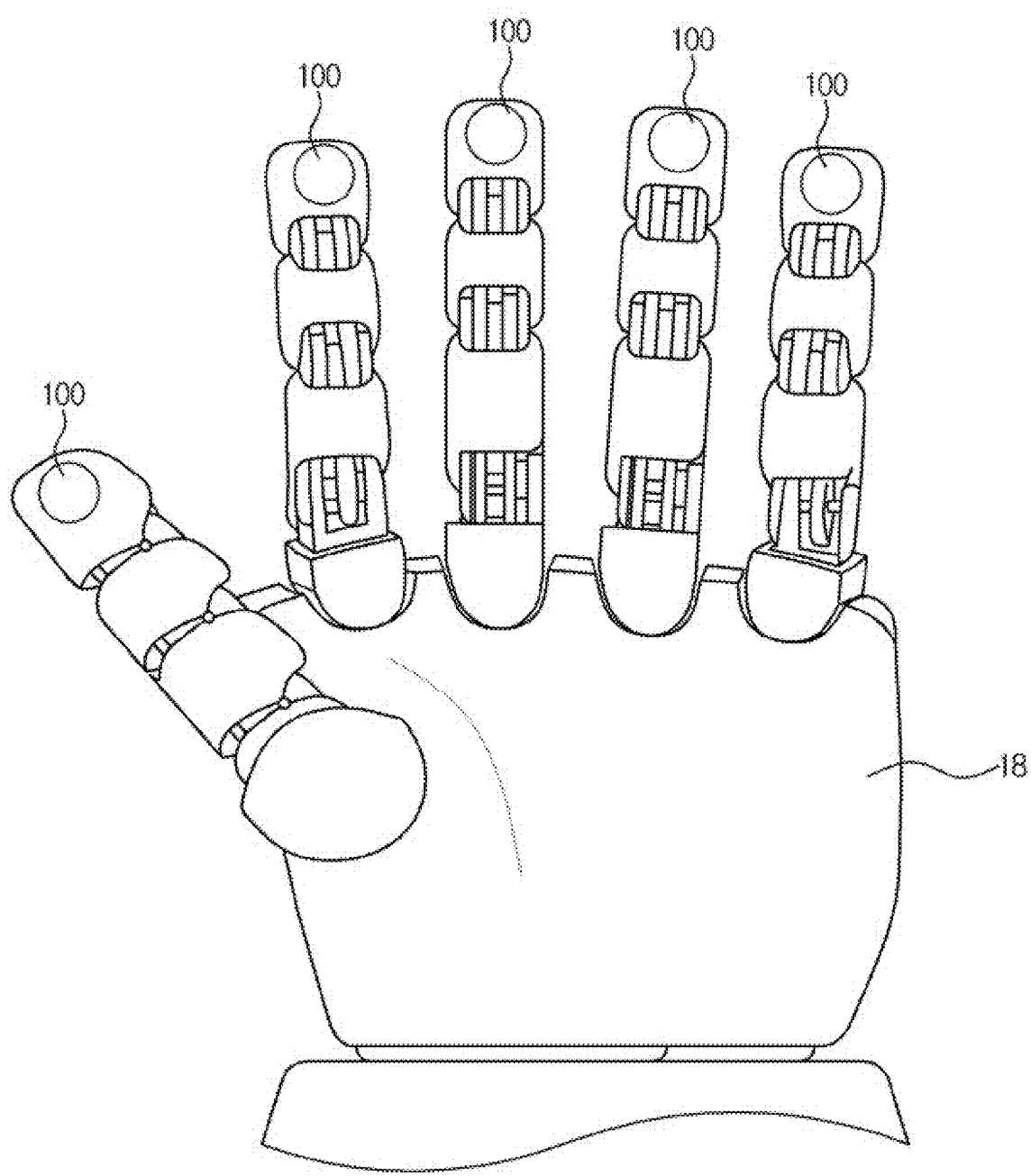
FIG. 5 is a view illustrating the support modules in accordance with an embodiment which are connected to a hand of the robot.

FIG. 3 is a view illustrating a robot with which support modules in accordance with an embodiment are connected, FIGS. 4A to 4C are views illustrating the support modules in accordance with an embodiment which are connected to a foot of the robot, and FIG. 5 is a view illustrating the support modules in accordance with an embodiment which are connected to a hand of the robot.

As shown in FIG. 3, a robot 1 includes a body part 10, at least one leg part 12 connected to the body part 10 and movably supporting the body part 10, at least one foot 14 connected to a lower end of the at least one leg part 12, arm parts 16 rotatably connected to the body part 10, and hands 18 connected to the ends of the arm parts 16, and support modules 100 may be attached to the foot 14 or the hand 18 of the robot 1.

The support modules 100 attached to the foot 14 of the robot 1 absorb impact applied to the robot 100 during a contact process of the robot 1 with the ground surface when the robot 1 walks, and stably support the robot 1. That is, in the initial stage in which the support modules 100 contact the ground surface, particle jamming does not occur and thus the support modules 100 are smoothly and flexibly operated corresponding to the ground surface contacting the support modules 100 and absorb impact applied to the robot 1. When the contact state of the support modules 100 with the ground surface is maintained for a designated time, particle jamming occurs and the support modules 100 form support bodies having rigidity and thus stably support the robot 1.

As shown in FIGS. 4A to 4C, the plurality of support modules 100 may be connected with apex parts or joint parts of the foot 14 so as to stably disperse a load of the robot 1 to support the robot 1. Here, the center of mass (not shown) of the robot 1 is located within a support polygon formed by the support modules 100.

As shown in FIG. 5, the support modules 100 attached to the hand 18 of the robot 1 allow the hand 18 to firmly support an object without damage to the object when the object is gripped by the hand 18. That is, in the initial stage in which the support modules 100 contact the object, particle jamming does not occur and thus the support modules 100 are smoothly and flexibly operated corresponding to the shape of the object contacting the support modules 100 and absorb impact applied to the object. When the contact state of the support modules 100 with the object is maintained for a designated time, particle jamming occurs and the support modules 100 form support bodies having rigidity and thus stably support the object.

The support modules 100 may be widely used to support general structures as well as in robots.

Figure 6:
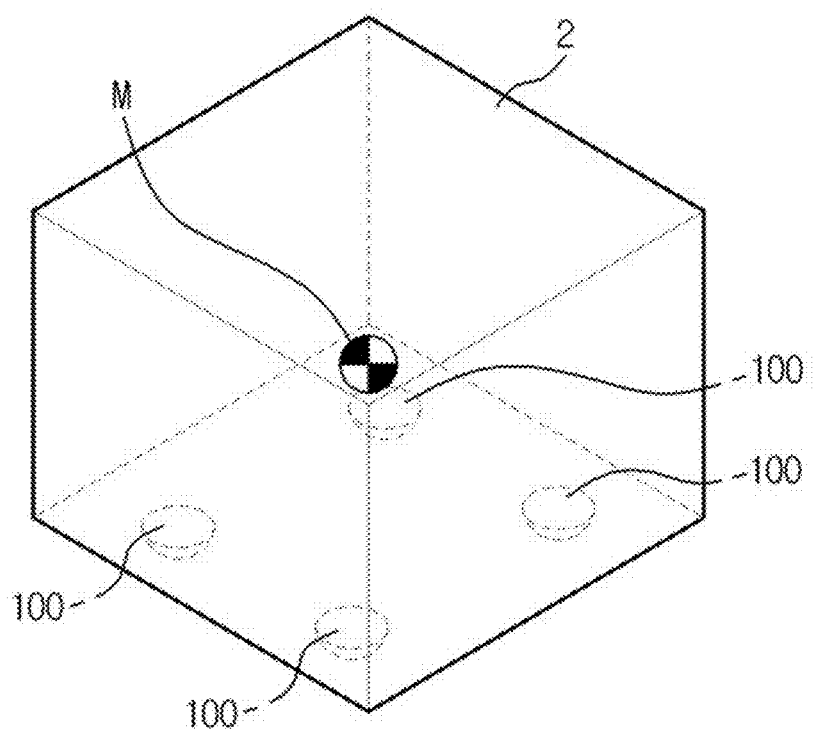
FIG. 6 is a view illustrating the support modules in accordance with an embodiment which support a general structure.

FIG. 6 is a view illustrating the support modules in accordance with an embodiment of the present invention which support a general structure.

As shown in FIG. 6, in the initial stage, the support modules 100 are located between a structure 2 and the ground surface corresponding to the shapes of the structure 2 and the ground surface, and when load of a designated intensity or more is applied to the support modules 100 by the structure 2, particle jamming occurs and the support modules 100 form support bodies having rigidity and thus stably support the structure 2.

At least three support modules 100 may be attached to the structure 2 to support the structure 2, and the center of mass (M) of the structure 2 is located within a support polygon formed by the support modules 100.

As described above, the support module 100 uses the principle of particle jamming, and may thus stably support a structure to be supported contacting the support module 100 regardless of the shape of the structure or the shape of a part of the structure.

As is apparent from the above description, in a support module and a robot having the same in accordance with an embodiment, the support module which is mounted on a leg part of the robot absorbs impact applied to the robot during a contact process of the support module with the ground surface, and forms a rigid body when pressure of a designated intensity or more is applied to the support module, thereby allowing the robot to stably walk.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A walking robot comprising:
a body part;
at least one leg part connected to the body part and movably supporting the body part;
a foot connected to a lower end of the at least one leg part; and
at least one support module connected to a lower end of the foot,
wherein the at least one support module includes,
a first rigid body connected to the lower end of the foot,
a space formation body connected to at least a portion of the first rigid body and forming a space part together with the at least a portion of the first rigid body, and
a plurality of hard particles located within the space part that form a second rigid body supporting a load of the robot when the support module contacts a ground surface and a volume of the space part is decreased to at least a set value, and
wherein the space formation body is formed of a material which is deformable to a shape corresponding to the shape of the ground surface during a contact process of the support module with the ground surface and is not contracted or expanded in any direction.

2. The robot according to claim 1, wherein a maximum volume of the space part is achieved in a state in which pressure is not applied to the support module.

3. The robot according to claim 1, wherein
air gaps are formed between the plurality of hard particles,
a pressure required to form the second rigid body increases as the volume in the space part occupied by the air gaps increases, and
a pressure required to form the second rigid body decreases as the volume in the space part occupied by the air gaps increases.

4. A support module comprising:
a first rigid body;
a space formation body connected to at least a portion of the first rigid body and forming a space part together with the at least a portion of the first rigid body; and
a plurality of hard particles located within the space part that form a second rigid body supporting a load of the first rigid body when pressure is applied to the support module and a volume of the space part is decreased to at least a set value,
wherein the space formation body is formed of a material which is deformable to a shape corresponding to a shape of a contact surface during a contact process of the support module with the contact surface and is not contracted or expanded in any direction.

5. The support module according to claim 4, wherein the space formation body is formed of a material which is not contracted or expanded in any direction.

6. The support module according to claim 4, wherein a maximum volume of the space part is achieved in a state in which pressure is not applied to the support module.

7. The support module according to claim 4,
wherein:
air gaps are formed between the plurality of hard particles; and the volume in the space part occupied by the air gaps is configured to be proportional to the pressure applied to the support module to form the second rigid body.

8. The support module according to claim 4, wherein at least three support modules are connected to a structure to support the structure, and a center of mass of the structure is located within a support polygon formed by the at least three support modules.

9. A surface contact structure comprising:
a rigid structure; and
a contact structure connected to the rigid structure and having a first shape,
wherein the contact structure includes,
a deformable structure containing a plurality of particles that are mobile within the deformable structure when a volume of the deformable structure is greater than or equal to a set value, and
the contact structure becomes rigid when at least a set amount of pressure is applied to the contact structure,
wherein the deformable structure is configured to deform to a shape corresponding to a shape of a surface during a contact process of the contact structure with the surface and is not contracted or expanded in any direction.

10. The surface contact structure according to claim 9, wherein the contact structure is adapted to contact the surface, and the rigid structure is connected to a load-bearing structure.

11. The surface contact structure according to claim 9, wherein a rigidity of the contact structure results from a decrease in the volume of the deformable structure less than the set value such that the plurality of particles are immobilized within the deformable structure.

12. The surface contact structure according to claim 9, wherein a mobility of the plurality of particles within the deformable structure is restored when the at least a set amount of pressure is removed from the contact structure.

13. The surface contact structure according to claim 9, wherein the contact structure is restored to the first shape when the contact structure is not in contact with the surface.

* * * * *